Oct. 3, 1944.  E. W. DAVIS  2,359,467
FLOW INDICATOR
Filed Oct. 19, 1942
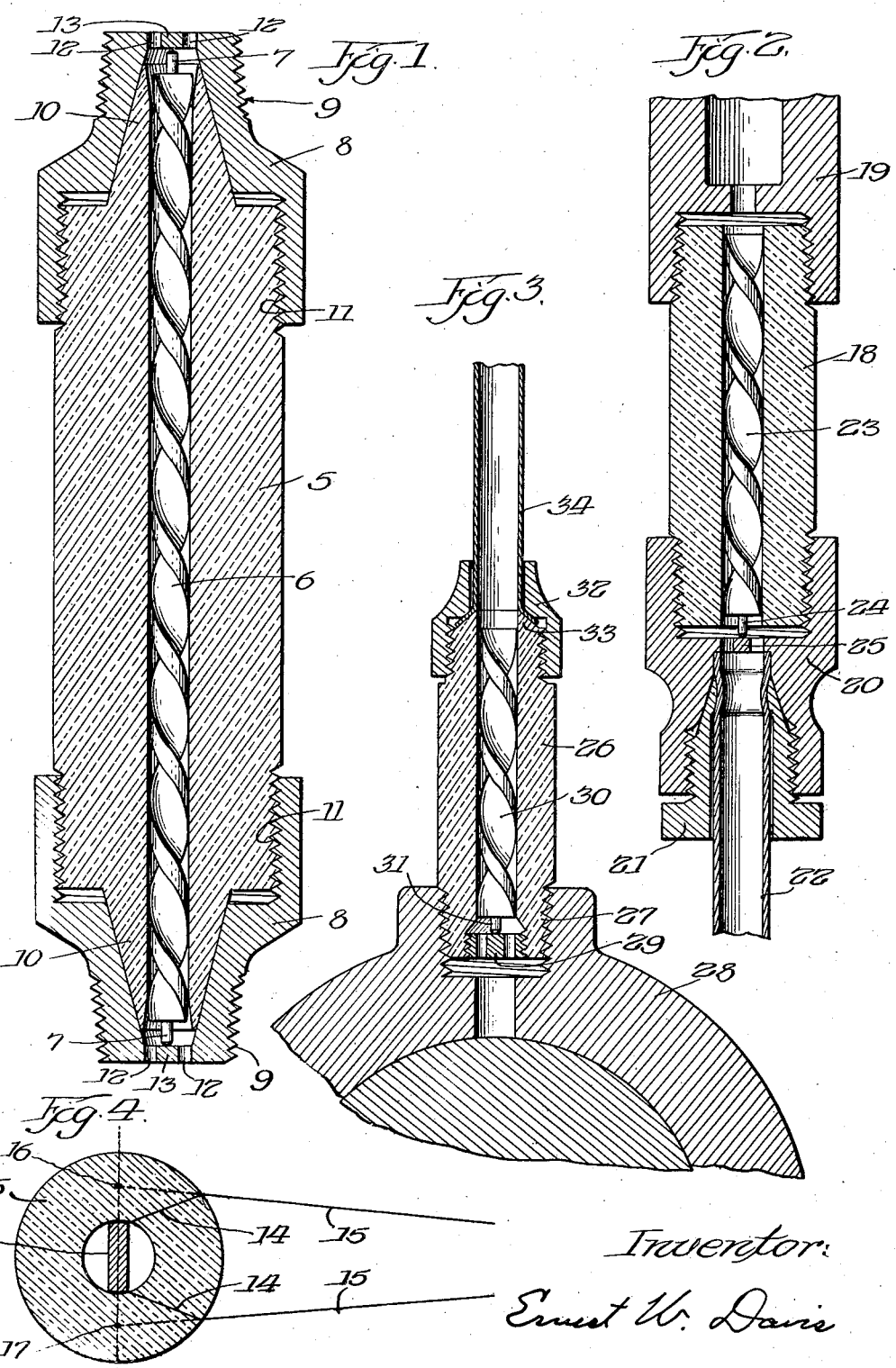
Inventor:
Ernest W. Davis Patented Oct. 3, 1944

2,359,467

UNITED STATES PATENT OFFICE 2,359,467

FLOW INDICATOR

Ernest W. Davis, River Forest, Ill.

Application October 19, 1942, Serial No. 462,657

12 Claims. (Cl. 116—117)

My invention relates to flow indicators for indicating the flow of viscous fluids or semi-fluids, and is especially adapted for indicating the flow of grease or heavy oil discharged by lubricating systems into machine bearings.

One object of my invention is to provide a device of the class described which is capable of indicating a very small rate of flow.

Another object is to provide a flow indicator wherein the flow of lubricant therethrough is clearly visible at a distance.

Another object is to provide a device of the class described in which the flow is substantially magnified.

Another object is to provide a device of the class described which will withstand a pressure of several thousand pounds per square inch.

A further object is to provide a device of the class described which comprises but few parts, and which can be manufactured at low cost. These and other objects will appear as the description proceeds.

In the drawing:

Figure 1 is a central, longitudinal section of one embodiment of my invention which is especially adapted for withstanding high pressure;

Figure 2 is a central, longitudinal section of another embodiment, which is particularly adapted for attachment to a source of lubricant pressure.

Figure 3 is a central, longitudinal section of a third embodiment which is particularly adapted for being attached directly to a bearing requiring lubrication; and Figure 4 is a transverse section of the flow indicator shown in Figure 1, and illustrates the refraction of light waves whereby the indicated rate of flow is substantially magnified.

Flow indicators of the type herein shown are useful for indicating the flow of lubricant in centralized lubricating systems, wherein lubricant delivered at high pressure from a single source is distributed by means of tubes to a plurality of bearings requiring lubrication. In some installations it is desirable to attach the flow indicators directly to the bearings to be lubricated; under conditions where the bearings are not accessible for observation the flow indicators may be located at the source of lubricant pressure; and in other installations it may be most advantageous to install the indicators at intermediate locations in the lubricant line. The embodiments herein shown, and described hereinafter, are adapted for all these conditions.

Referring to the construction illustrated in Figure 1, the cylindrical, tubular member 5 is constructed of methyl methacrylate plastic, which is particularly suitable for this part owing to its high tensile strength, its low absorption, its colorless, crystal clear transparency, and its high index of refraction, whereby light waves passing through its surface at an oblique angle are bent in a manner that produces substantial magnification.

The helical rotor 6 fits closely in the tubular member 5, but not tight enough to bind and prevent rotation. The rotor 6 is constructed by twisting a steel bar about its longitudinal axis; then turning down the ends to provide the pivots 7, 7; and then grinding in a centerless grinder to provide arcuate shaped edges (as shown in Figure 4) which conform with the bore of the tubular member 5.

The tubular member 5, Figure 1, is provided with screw threads 11, 11 for attaching the metal end pieces 8, 8, which are provided with pipe threads 9, 9 for attachment in the lubricant line. Each end of the tubular member 5 is provided with a tapered portion 10, 10, which fits in the end piece 8 to provide a leak proof seal, the tapered portion 10 being forced outwardly by the high pressure of the lubricant. The diameter at the extreme end of the tapered portion 10 is about one quarter the diameter of the threads 11, so that the transverse area is only one-sixteenth as large, whereby the unit stress on the threads 11, caused by the lubricant pressure, is not excessive.

This construction, combined with the relatively small bore of the tubular member 5, permits the use of a relatively weak, non-metallic, transparent substance for the tubular member 5, whereby visible action under high pressure may be secured without the necessity of using external, metal tension members extending from end to end, such as are commonly used where a transparent tube is subjected to high pressure. In the construction shown, the longitudinal tension of the tubular member 5, provides the sole reactive force for resisting the longitudinal force tending to separate the end pieces 8, 8, due to the lubricant pressure, and therefore no external tension members are required.

Each end piece 8 is provided with eccentric openings 12, 12, for permitting lubricant to flow through the indicator. The unperforated portion 13, at the center, acts as a thrust bearing for the pivot 7. It will be observed that the bore of the tubular member 5 forms the only radial bearing for the rotor 6, so that the rotor is always free to turn, regardless of unavoidable eccentricity of the end pieces 8, 8 resulting from high production manufacture. By eliminating radial bearings in the end pieces 8, 8, the necessity for high precision is also eliminated.

In prior devices of this class, the rotating member is supported within the tube by means of radial and thrust bearings, a construction which necessitates high precision manufacturing in order to provide the necessary small clearance combined with accurate concentricity, while in the indicator of this invention, the plain thrust bearings, without radial action, are adaptable for inexpensive manufacture by high production methods, and provide a floating rotor which is free to acquire the most advantageous position for its uninterrupted rotation.

The operation of this indicator is quite obvious. Lubricant passing through the bore of the tubular member 5, tends to flow without rotation, due to its inherent viscosity, and its contact with the bore of the tubular member 5. The reaction produced by this resisting force of viscosity, causes rotation of the rotor 6, which rotation permits the lubricant to follow its tendency to move longitudinally without rotation.

This operating principle is quite different from that of similar devices used with non-viscous liquids, wherein the force of momentum causes rotation of a helical rotor. The force of momentum varies with the square of the velocity, and when the velocity is very low, no rotation of the rotor will occur. But in the device of this invention, wherein viscous lubricant is used, the rotor responds to any rate of flow, no matter how low.

Referring to Figure 4, the film of lubricant between the arcuate shaped edge of the rotor 6 and the tubular member 5, is relatively thin so that motion of the edge of the rotor 6 is visible even when the indicator is used with dark colored lubricants. In order to secure this visibility, light must travel through the lubricant film twice; it must first travel through the film of lubricant to illuminate the rotor, and the light reflected by the rotor must then travel back through the lubricant film to reach the observer's eyes. Therefore, the clearance between the rotor 6, and the tubular member 5, must be less than half the penetrating distance of light through the most opaque lubricant that is to be used.

The motion of the rotor 6 is made more apparent by the magnifying action of the tubular member 5, as illustrated in Figure 4. Light waves reflected by the rotor 6 along the lines 14, 14 are refracted as they leave the tubular member, and then follow the lines 15, 15 to the observer's eyes. This produces an apparent diameter of the rotor 6, equal to the distance between the points 16 and 17. The degree of refraction is determined by the relative velocities with which light waves are propagated through the material of the tubular member 5, and through air, or in other words, by the index of refraction of methyl methacrylate plastic, which is highly satisfactory for this purpose.

The embodiment illustrated in Figure 2 is particularly adaptable for use in a multiple pump, wherein a common driving mechanism actuates a plurality of lubricant pumps, all receiving lubricant from a common source, and each discharging lubricant in measured amounts to a corresponding tube leading to one of the bearings on the machine which is to be lubricated. A flow indicator is attached to the outlet of each pump, and these flow indicators afford visible indication of the amount of lubricant supplied to each bearing.

In such an installation, each transparent tube 18 screws directly into one of the pump outlets 19, and is threaded at the lower end for attachment to the tube coupling 20, which is provided with a bushing 21 for securing the copper tube 22 leading to a bearing requiring lubrication. The rotor 23 is similar to the rotor 6 in Figure 1, but has only one pivot 24 (Figure 2), which rests on the thrust bearing 25, integral with the coupling 20.

When all the bearings on a machine are accessible for convenient observation, it may be desirable to attach each flow indicator directly to a bearing, as illustrated in Figure 3. Here, the lower end of the transparent tube 26 is provided with a pipe thread 27 for attachment to the bearing 28. The thrust bearing 29 is threaded into the tube 26. The rotor 30 and pivot 31 are similar to those previously described. The upper end of the tube 26 is threaded to receive the coupling bushing 32, and is provided with a tapered portion 33 for making a lubricant-tight seal with the flared copper tube 34, through which lubricant is supplied to the bearing 28.

I claim:

1. In a flow indicator for a centralized lubricating system, a transparent tubular member having a relatively small bore therein and having a tapered sealing portion at the upper end thereof, said tubular member having screw threads at each end thereof, and the screw threads at the lower end being adapted for screwing directly into a bearing to be lubricated; a bushing having threads for engagement with the threads at the upper end of said tubular member, said bushing being adapted to compress a flared metal tube against said tapered sealing portion whereby said metal tube and said transparent tube may be coupled together to form a lubricant tight joint; a helical-shaped rotatable member within said tubular member, and visible therethrough; and a thrust bearing for limiting the downward movement of said rotatable member.

2. In a flow indicator for a high pressure lubricating system, a transparent tubular member; a helical-shaped rotatable member rotatively supported within said tubular member and visible therethrough; and a metal end piece secured to said tubular member, said tubular member having a tapered sealing portion terminating in a relatively thin edge, and said end piece having a tapered cavity for receiving said sealing portion, whereby lubricant pressure within said tubular member will force said edge against said end piece to form a lubricant tight seal therewith.

3. In a flow indicator for a high pressure lubricating system, a transparent tubular member having a threaded end; a helical-shaped rotatable member within said tubular member and visible therethrough; a thrust bearing for limiting longitudinal movement of said rotatable member; and a metal end piece screw threaded to said threaded end of said tubular member, said end piece having a sealing portion engaging with a corresponding sealing portion on said tubular member for forming a lubricant tight seal therewith, and the transverse area of said threaded end being several times as large as the transverse area of the sealing portion of said tubular member, whereby said flow indicator may be subjected to high lubricant pressure without stripping the threads at said threaded end of said tubular member.

4. In a flow indicator, a transparent tubular member; a rotatable helical member within said tubular member and visible therethrough; two metal end pieces, one screwed onto each end of said tubular member, each end piece having a thrust bearing integral therewith, and said thrust bearings confining only longitudinal movement of said helical member.

5. In a flow indicator, a transparent tubular member having an inlet end and an outlet end, said tubular member being threaded at its outlet end for screwing directly into a bearing; means at the inlet end of said tubular member for connecting said tubular member with a lubricant line; a rotatable helical member within said transparent tubular member and visible therethrough; and a thrust bearing secured directly to said tubular member and confining longitudinal movement of said helical member.

6. In a flow indicator, a transparent tubular member; a helical member rotatively supported in said tubular member; and a single thrust bearing for said helical member, said thrust bearing being positioned to oppose longitudinal movement of said helical member under the influence of the resultant of the forces of gravity and lubricant pressure.

7. In a flow indicator, a transparent tubular member; a tube coupling including a body member and a tube-compressing member; a helical member rotatively supported in said tubular member; means for securing said body member to said tubular member; and a thrust bearing for said helical member, said thrust bearing being integral with said body member and being positioned to oppose longitudinal movement of said helical member under the influence of the resultant of the forces due to gravity and lubricant pressure.

8. In a flow indicator, a transparent tubular member having an inlet end and an outlet end, said tubular member being threaded at its inlet end for direct connection with a high pressure lubricant discharge mechanism; a tube coupling including a body member and a tube-compressing member; means for securing said body member to said tubular member; a helical member rotatively supported within said tubular member; and a single thrust bearing for said helical member, said thrust bearing being carried by said body member and being positioned to oppose longitudinal movement of said helical member under the influence of the resultant of the forces due to gravity and lubricant pressure.

9. In a device for indicating a flow of lubricant in a high pressure lubricating system, a bearing for supporting a rotating shaft; a screw-threaded, lubricant-inlet opening in said bearing; a transparent tubular member having an inlet end and an outlet end, said outlet end being threaded to fit said screw-threaded opening, whereby said tubular member may be attached directly to said bearing; and a helical member rotatively supported within said tubular member.

10. In a flow indicator, a transparent tubular member having an inlet end and an outlet end; means for connecting said inlet end with a lubricant line; a helical member rotatively supported within said tubular member and visible therethrough; and a single thrust bearing for said helical member, said thrust bearing being secured to said tubular member.

11. In a flow indicator, a transparent member having a lubricant-conducting bore extending therethrough; a rotatable helical member within said bore; and a thrust bearing for said rotatable member, said thrust bearing opposing longitudinal movement only of said rotatable member in the direction of the resultant of the forces of gravity and lubricant pressure, and the surface of said bore forming the sole radial bearing for said rotatable member.

12. In a device for visibly indicating the flow of relatively opaque lubricant in lubricating apparatus, a transparent tubular member having a cylindrical bore therein; a rotatable helical member within said bore; and a bearing opposing only longitudinal movement of said rotatable member under the influence of the resultant of the forces due to gravity and lubricant pressure, the clearance between said helical member and said bore being less than half the penetrating distance of light through the most opaque lubricant used in said lubricating apparatus, whereby rotation of said helical member caused by the flow of said lubricant through said bore may be observed through said transparent tubular member, and whereby the approximate relative quantity of lubricant passing through said flow-indicating device is visibly indicated.

ERNEST W. DAVIS.